United States Patent [19]

Delaney

[11] 4,264,956
[45] Apr. 28, 1981

[54] CALL COST MONITOR

[76] Inventor: John M. Delaney, 39 Grantwood Rd., Wayne, N.J. 07470

[21] Appl. No.: 98,267

[22] Filed: Nov. 28, 1979

Related U.S. Application Data

[63] Continuation of Ser. No. 919,345, Jun. 26, 1978, abandoned.

[51] Int. Cl.³ .............................................. G06F 15/21
[52] U.S. Cl. ................................ 364/467; 179/7.1 R; 364/705
[58] Field of Search ............... 364/467, 464, 715, 705; 235/92 TE; 179/7.1 R, 7.1 TP

[56] References Cited

U.S. PATENT DOCUMENTS

| | | | |
|---|---|---|---|
| 3,164,677 | 1/1965 | Morris et al. | 364/467 X |
| 4,013,839 | 3/1977 | Bell | 179/7 R |
| 4,041,291 | 8/1977 | Pavda | 364/467 X |
| 4,065,640 | 12/1977 | Roviller | 179/7.1 TP |
| 4,122,308 | 10/1978 | Weinberger et al. | 179/7.1 R |

Primary Examiner—David H. Malzahn

[57] ABSTRACT

A telephone call cost monitor to enable the user of a telephone to monitor accurately the cost of his outgoing phone calls while those calls are in progress. The device includes a programmable memory, a micro-computer, a keyboard for data entry, a pickup coil to sense signals on the telephone line, an internal timer, a digital clock display, and start and stop keys. The device enables a user to preprogram at his convenience the telephone numbers he calls and the various tariffs for these calls. Thus, when the user wishes to monitor the cost of a call, he only needs to push the start key when actual connection is made with the called telephone. The cost of the call is continuously displayed and at the completion of the call the user only has to push a reset button to prepare the device for the next call.

10 Claims, 2 Drawing Figures

CALL COST MONITOR

This is a continuation, of application Ser. No. 919,345, filed June 26, 1978 now abandoned.

BACKGROUND OF THE INVENTION

1. Field of the Invention

This invention pertains generally to telephone systems having means of registering numbers called and cost rates for the numbers called, retaining this data in a memory, timing the length of completed calls, and computing the actual cost of completed outgoing telephone calls. It is a user-oriented, small portable device designated to monitor the cost of the customer's telephone calls on a continuous basis. The device utilizes a microcomputer based calculator, programmable memory, keyboard data entry, continuous digital display, a continuous clock and a pickup coil to sense signals on a telephone line. In particular, this invention pertains to a consumer device which enables the consumer to monitor accurately the cost of his out-going telephone calls as those calls are in progress. As a consumer device, it is extremely simple to use.

2. Description of the Prior Art

Since the beginning of telephone service, telephone companies have developed and used equipment to monitor customer use of telephone service and to compute the customer's bill by calculating the length of time of the call multiplied by the rate in effect at the time of the call plus the applicable tax. The customer, or consumer, of telephone service has no way of knowing what his telephone bill will be until he actually receives it, except for the basic monthly rate he pays for telephone service (which may or may not include a limited number of local calls). Since telephone usage is to a great extent discretionary, the consumer should have a simple and reliable means of knowing the cost of the service as he uses it rather than wait a month to find out that he has overspent his budget. The rate schedules and tariffs published by telephone companies are of limited value and barely intelligible to the average cost conscious consumer, and of no value to those who lack computational skills. The device of the present invention is intended to be a portable simple, inexpensive means for the average consumer of telephone service to monitor the actual cost of the outgoing telephone calls he makes.

The prior patent art in cost computation systems for telephone calls is primarily oriented to central billing systems for telephone companies and operators of private branch exchanges. In a search of the prior patent art the applicant could find only two patents relevant to the disclosure of this invention. (U.S. Pat. No. 3,508,392 utilizes an old technology and is obsolete by current standards).

U.S. Pat. No. 4,065,640, issued to Rouiller, and U.S. Pat. No. 4,041,291, issued to Pavda, are the closest patents to the present invention which the applicant could find. Both of these patents depend upon the telephone company supplying coded electrical information for their automatic operation. This is not currently supplied by the telephone companies and there is no indication that it will be supplied in the near future. U.S. Pat. No. 4,041,291 teaches a small, portable instrument for simultaneously timing, computing and calculating the cost plus tax of a running long distance telephone toll call in dollars and cents and displaying its results on a screen. As such, the disclosure of this patent is very close to that of the present application. However, the device disclosed in that patent has many deficiencies which effectively serve to defeat its purpose. Its prime deficiency is that it requires the entry of telephone numbers and tariffs to be used each time a call is made, making it both difficult and time consuming for the average consumer to use. The procedural program of the device of this patent is using what should be fixed or stored data as variable data to be entered repetitively. The system program reverses the logic and rationale of a digital device and makes it both more complicated to use and more expensive to manufacture.

The device of the present invention uses a more conventional program logic to achieve the same goal while resulting in a device which is far simpler for the consumer to use and understand. It is also more easily expandable to more sophisticated and intensive uses such as those in a small business or a private PBX. For the purpose of this discussion, we shall ignore local message unit service or measured service since it accounts for only a small portion of the variable factor in the consumer's monthly telephone bill. It should be clearly understood, however, that the system of the present invention can easily handle such service in the same way that it handles long distance toll call service.

Experience has shown that the largest single cost variable in the average consumer's telephone bill is the long distance toll call. Furthermore, most long distance toll calls represent controllable, discretionary expenditures, either for the call itself or the length of time the call takes. Additionally, the average consumer calls only a few long distance numbers with any degree of regularity which would affect his cost. These would be the numbers of friends, relatives, business associates, customers, and the like. Thus, for the average consumer, only about twenty to fifty long distance telephone numbers are called with any degree of regularity that would significantly impact his costs. Another factor that affects the consumer's cost is that there are two basic rate structures in effect for long distance toll calls, one rate structure for interstate calls and one for intrastate calls.

The object of the present invention is to provide the consumer, especially the unsophisticated consumer, with a very simple and very inexpensive device to monitor the cost of his discretionary out-going long distance phone calls as these calls are in progress. Simplicity of use and low cost are achieved by providing a device which can be preprogrammed (by a third party, if necessary) to meet the needs of the individual consumer, by providing only the minimal memory to meet these needs, and by requiring the consumer to activate only a start key at the beginning of a call and a stop key at the end of the call.

The call cost monitor of the present invention is in effect a small, self-contained portable programmable computer which provides a means for the telephone utility consumer to monitor automatically the cost of at least a limited number of his long distance telephone toll calls. The cost is displayed on a digital display and updated each minute while the call is in progress. The call cost monitor functions independently of the telephone and thus is not dependent upon an interconnection into the telephone line for its operation. Its operating mode is automatic and it does not require that the telephone company supply coded pulse information identifying the cost of each toll call dialed. When not in use as a call cost monitor, it can continuously display the time of day.

SUMMARY OF THE INVENTION

This invention pertains to a call cost monitor, that is, a device designed to permit the person making an outgoing long distance telephone call to monitor the cost of that call as the call is in progress. The call cost monitor is designed for the use of the average consumer such that it will be simple to use. The device is based on a microcomputer and includes a number of elements which will be specified as to function and frequency of use. A keyboard is provided for non-volatile data entry. The data to be entered is a list of frequently called numbers, and the applicable rate structures or tariffs for these numbers (intrastate or interstate; day, evening, or night, the day of the week and the time of day. The data entry function is used at user's convenience and may be used by a third party if the unsophisticated consumer does not understand how to use it. This function need be repeated only if the list of frequently called numbers changes or the tariff rates change. The device also includes a continuously operating, twenty-four hour clock. This clock (which includes a day of the week function) must be set once through the data entry function. Except for the time which sets the clock, all other non-volatile data entered is stored in an electrically alterable read only memory (EAROM). When the call cost monitor is not monitoring a telephone call, it is used as a digital clock, continuously displaying the time of day on its display mentioned hereinafter.

The device further includes a sensor device which may be a transducer, a pickup coil or a wrap-around current probe which the user can easily place in proximity to the insulated wire which carries the telephone signals of the telephone set he is using. The function of this sensor is to activate the device when a stored number is dialed. No direct connection to the telephone is required.

The device further includes a display to inform the customer visually or audibly of the cost of the call in progress. The display is updated by the minute since the telephone tariffs are based on minute rates. When not displaying call costs, it displays the time of day and day of the week.

The balance of the device is a small microcomputer and associated peripheral devices to permit the call cost monitor to achieve its function. A shift register and a touch tone decoder are used to feed amplified signals from the telephone line sensor to the microcomputer. A decoder is used to feed the output the microcomputer to the display.

When the cost call monitor is preprogrammed with frequently called numbers, tariff rates, the time of day and day of the week, and the sensor is set in proximity to the telephone set wire, the unit is ready to use. When the caller picks up his telephone and receives a dial tone, the microcomputer program is started. When the consumer dials a number, the tones or pulse trains are picked up by the sensor and "read" by the microcomputer. If the number dialed matches a preprogrammed number, the call monitor function is activated. Up to this point the consumer has done nothing to the device. When the call is completed by the called party picking up his telephone, the consumer pushes a start key and a timer is started in the microcomputer.

At this point the call cost monitor has: the time of day and day of the week; the number called; and the applicable tariff for that number and time; and a timer to keep track of the length of the call. As the call progresses, the microcomputer will compute the cost of the call and feed it to the display on a timely basis. The consumer then knows the cost he is incurring as the call progresses. When the call is terminated by disconnection the caller records or remembers the cost and pushes a reset key to restore the call cost monitor to its original state, ready to sense the next dial tone. The device is portable and small in size.

DESCRIPTION OF THE PREFERRED EMBODIMENT

Figure 1:
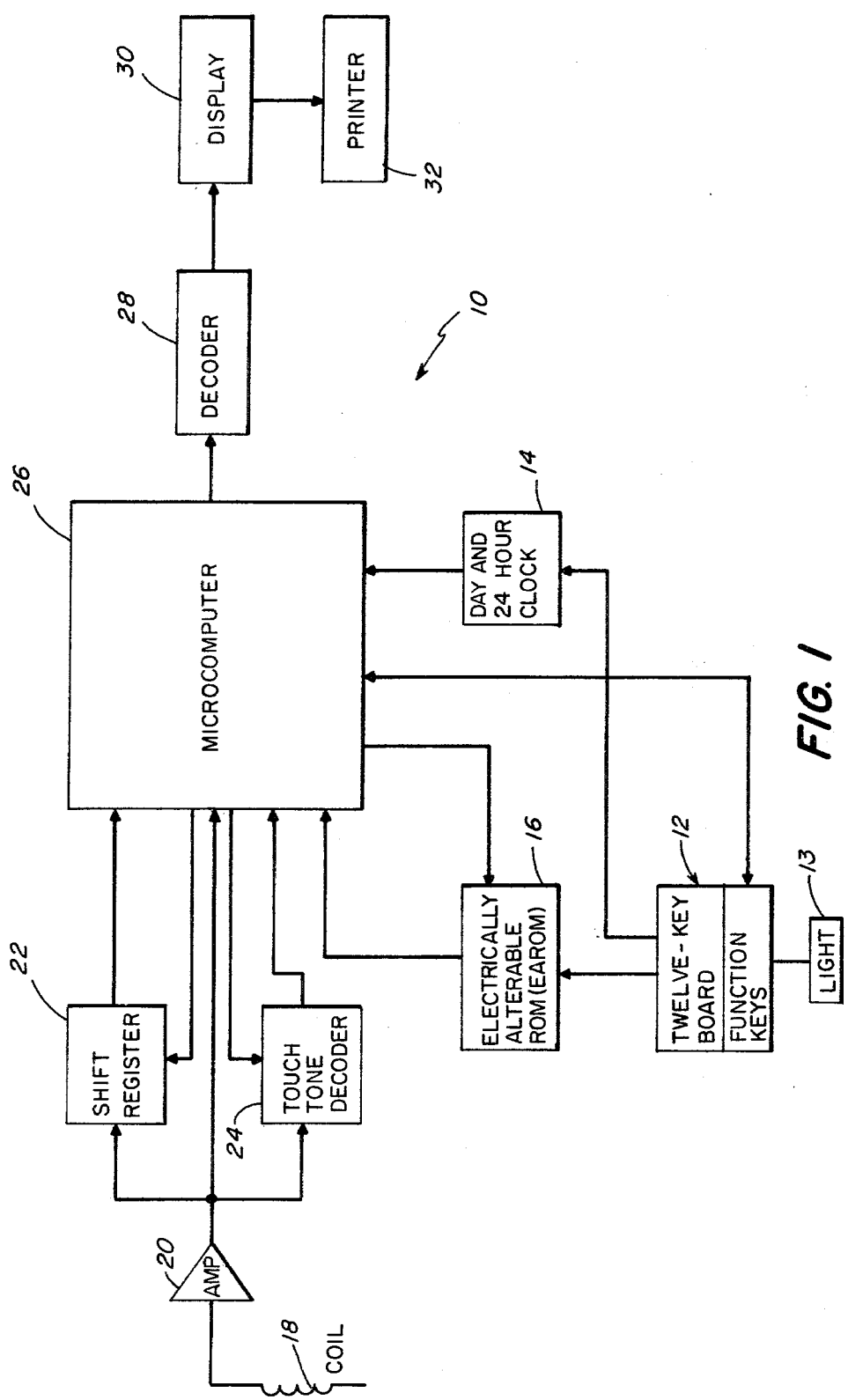
FIG. 1 is a block diagram of the call cost monitor of the present invention.

Referring now to the drawings, FIG. 1 is a block diagram of the call cost monitor of the present invention, designated generally by the reference numeral 10. Call cost monitor 10 is a microcomputer-oriented device having a number of functional units which will be described with reference to FIG. 1, and the operation of the microcomputer will be detailed with reference to FIG. 2.

The first functional unit is the keyboard 12. Keyboard 12 is a standard twelve key keyboard similar to the touch-tone pad found on telephones. They keyboard is the only means the user has to enter data into the memory 16 of call cost monitor 10. Ten keys are used to represent the ten digits of the decimal system and the other two keys serve as function keys, their functions depending on whether the call cost monitor is in the programming mode or the opertional mode. When device 10 is in the operational mode, the telephone handset is off the hook and a dial tone detected, one function key serves as the start key and the other function key serves as the stop or reset key. When device 10 is in the programming mode each function key can, through a multiple pressing or in a combination of pressings, enter the stable or non-volatile data to be entered into the memory 16 of device 10. For example, a single pressing of a function key followed by up to five digits indicates that the day of the week and the time of the day (on a twenty-four hour clock) are being entered. The day and time may be entered only once since device 10 includes a continuously operating twenty-four hour clock 14. Tariffs are entered by pressing one or more function keys in combination followed by up to four digits. The combination of function keys will be determined by the program. Frequently called numbers are entered by depressing a function key or keys in a specific combination determined by the program, followed by the telephone number. For the operation of device 10, the only digits needed are the area code and the exchange number. The program can simply ignore the last four digits of a full telephone number.

Once the day and the time of day are entered through keyboard 12, that data is fed to the twenty-four hour clock 14 and the time signals pass through microcomputer 26, and are decoded by decoder 28 to be continuously displayed by display 30, until a telephone call cost must be displayed.

Memory 16 is an electrically alterable read only memory which stores all the non-volatile data entered through keyboard 12 such as the list of frequently called numbers and the rate or tariff structures. For the list of frequently called numbers only the area code and exchange number need be stored, thereby saving memory space.

Tariffs need be entered when device 10 is first put in use and reprogrammed only when they change. The list of frequently called numbers may be reprogrammed only as that list changes. The use of only area code and exchange number serves to reduce the size of the memory 16 required or expand the list for a memory 16 of a given capacity. Since device 10 can be preprogrammed, the unsophisticated consumer can seek assistance in programming the unit. The only keys which the unsophisticated consumer needs to use are the start and stop keys.

To install device 10, the only operation the consumer need to perform is to place a sensing device such as a transducer, a coil 18 or a wrap-around current probe around the insulated wire which carries the telephone pickup signals. Coil 18 serves as a sensor which will activate the cost monitoring function. Signals from coil 18 are amplified by amplifier 20 and fed through a shift register 22 or touch tone decoder 24 to microcomputer 26.

When the caller picks up his telephone and receives a dial tone, the pickup coil 18 senses the tone frequency and activates the microcomputer 26. Upon receipt of the dial tone, microcomputer 26 resets the shift register 22 and the touch tone decoder 24. When the caller dials a number, either touch tones or pulse trains are sensed by pickup coil 18. If an ordinary pulse type telephone is used, the dialed number is stored in shift register 22. If a touch tone telephone is used, the number is stored in the touch tone decoder 24. Microcomputer 26 compares the number stored in either shift register 22 or touch tone decoder 24 with all the numbers the consumer had previously stored in electrically alterable read only memory 16. If the dialed number does not match any previously preprogrammed number in memory 16, the microcomputer allows the clock 14 to drive the display. If the dialed number (area code and exchange prefix number) matches a number stored in memory 16, the microcomputer sends out a discrete level which causes the start key function to be activated. An optional light 13 on keyboard 12 may be turned on. If the called party fails to answer, the caller need only press the reset or stop function key.

If the called party picks up his telephone, the start key on keyboard 12 is depressed by the caller. This causes the microcomputer 26 to inhibit the twenty-four hour clock from driving the visual display 30 (but permitting it to keep time internally). It also starts a timer in the microcomputer 26.

Device 10 now has in its microcomputer 26 the day of the week; the time of day the call is made for tariff purposes; the tariff for that time of day and a timer counting the length of the call. As the call progresses, the microcomputer computes its cost and feeds this information through a decoder 28 to visual display 30 where it can be viewed by the caller as the call progresses. For visually handicapped persons display 30 could be an audible display. Thus, the consumer knows the cost of the call as he makes it. Display 30 is continuously updated as the length of time of the call increases. When the call is completed, by termination of the connection between the called party and the caller, the final cost is displayed. The caller then pushes the reset function key which resets device 10, again allowing the twenty-four hour clock to drive display 30.

Figure 2:
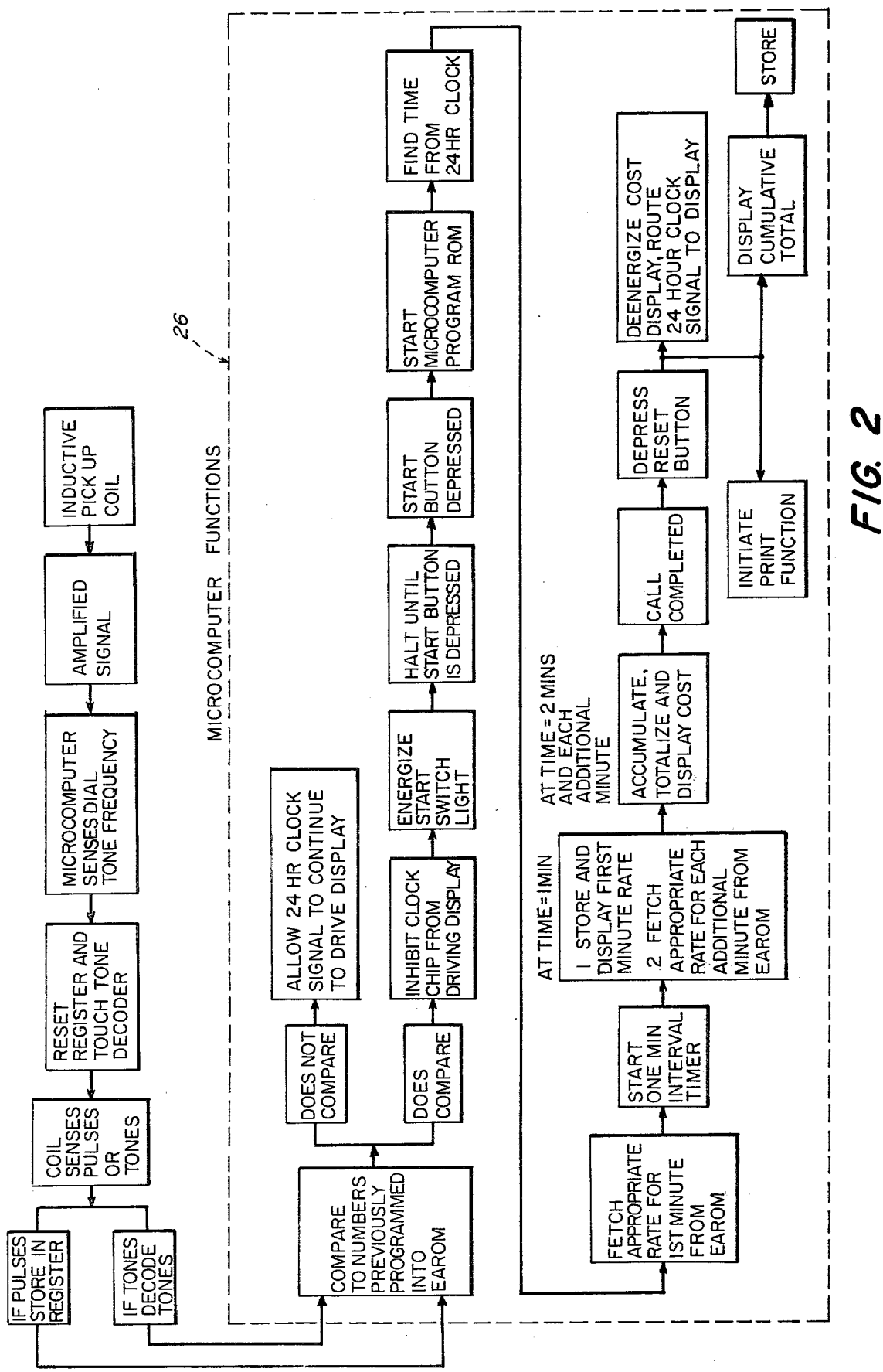
FIG. 2 is a signal flow chart of the functions of the microcomputer shown in FIG. 1.

Referring now to FIG. 2, the functions of microcomputer 26 are diagrammed therein. If microcomputer 26 senses a dial tone, it resets shift register 22 and tone decoder 24. If coil 18 senses pulses, the amplified pulses are stored in shift register 22. If coil 18 senses tones, the tones are decoded in tone decoder 24. Clock 14 continues to drive display 30. Microcomputer 26 then compares the numbers sensed and stored to previously preprogrammed numbers. If no comparison is made, the program aborts, and clock 14 continues to drive display 30. If a comparison is made, the start function key is energized and an optional light is turned on. The program then halts until the start function key is depressed. When the start key is depressed, clock 14 is inhibited from driving display 30 and the microcomputer 26 program starts. It reads the day and time from clock 14, the corresponding tariff for the first minute from EAROM 16 and starts a one minute timer. After one minute, microcomputer 26 stores and displays in display 30 the first minute rate. Microcomputer 26 then retrieves from memory 16 the tariff for each succeeding minute. At the end of each succeeding minute, microcomputer 26 accumulates, totals and displays the cost of the on-going call. At the completion of the call, when the connection between the caller and the called party is terminated, the caller reads and notes the cost and then depresses the stop function key. The display 30 is deenergized, device 10 is reset, and clock 14 drives display 30 again.

As is evident from the foregoing description, device 10 requires only the depressing of a start key and a stop key for the consumer to use in its operational mode. The preprogramming can be done at the user's leisure, and with assistance if necessary. It is no more complex than the use of a hand-held calculator, but the user can seek assistance at his leisure.

Device 10 is self-contained, automatic in operation and may be operated by a battery or an ac power supply. It should be noted that the quantity of telephone numbers stored in memory 16 is limited only by the capacity of the memory.

While I have described and illustrated one embodiment of my invention, many variations will occur to one skilled in the art. For example, by simply enlarging memory capacity, even measured local calls can be monitored. Further variations would include the incorporation of a "Holiday" function, whereby upon entering a function code the day of the week (on the twenty four hour clock 14) would be ignored by the microcomputer and the weekend tariffs substituted. For calls having the rate calculated on the basis of the first two minutes and each additional minute (rather than for the first minute and each additional minute), or when an area code may not be required, the EAROM 16 programming could be modified by standard programming techniques. Other options could include a monthly cumulative cost toal, which is a program addition, and the incorporation of a smaller printer 32 in device 10.

I claim:

1. A call cost monitoring device for the user to monitor the cost of a selected number of his outgoing telephone calls as the calls are in process comprising:
    a microcomputer including a plurality of input and output terminals;
    an electrically alterable memory for the storage of a selected group of telephone numbers to be monitored and telephone billing rate information, said electrically alterable memory electrically interconnected to said microcomputer for processing said numbers and rate information;

data entry means having a first output terminal connected to an input terminal of said electrically alterable memory for entering said telephone numbers to be monitored and billing rate information into said electrically alterable memory said data entry means having a second output connected to an input of said microcomputer, said data entry means providing microcomputer control signals on said second output;

sensing means including an output terminal, in proximity to a user telephone line to sense signals representing telephone numbers being called said sensing means producing electrical signals at said output terminal proportional to said sensed signals;

processing means having an input terminal connected to said sensing means output terminal and an output terminal connected to an input terminal of said microcomputer, said processing means responsive to said sensing means to prepare said proportional electrical signals for entry into said microcomputer;

a continuously operating clock having an input terminal and output terminal, said input terminal connected to a third output terminal of said data entry means for entering the time of day and day of week into said clock, said clock output terminal connected to said microcomputer, said clock having an output which is a coded representation of the time of day and day of week;

said microcomputer programmed to receive and process data from said clock, from said processing means, and from said data entry means, and also being programmed to receive, compare and process data from said electrically alterable memory;

said microcomputer being further programmed to compute the cost of a telephone call to one of said group of telephone numbers in said alterable memory on a real time basis;

display means to display the selected call cost to the user, said display means having an input terminal connected to an output terminal of said microcomputer, said display means being responsive to electrical signals from said microcomputer to produce the selected call cost display.

2. The device of claim 1 wherein said data entry means comprises;

a twelve key keyboard;

ten of said keys representing the ten digits of the decimal number system and two of said keys serving as function keys;

all of said keys being used in combination to preprogram telephone numbers and billing rate information into said memory and day of week and time of day into said clock in a programming mode of said device;

said function keys serving as the start and stop keys in an operational mode of said device.

3. The device of claim 2 further including a printer, said printer being responsive to electrical signals from said microcomputer, said printer being activated to print the cost of an individual call completed by the pressing of a key on said keyboard.

4. The device of claim 2 wherein said display displays the time of day when said device is not in use as a call cost monitor.

5. The device of claim 1 wherein said sensing means is a coil positioned in proximity to a telephone line to sense signals on said telephone line.

6. The device of claim 1 wherein said sensing means is a wraparound probe positioned in proximity to a telephone line to sense signals on said telephone line.

7. The device of claim 1 further comprising: an amplifier interconnected between the output terminal of said sensing means and the input terminal of said processing means for amplifying said proportional electrical signals for subsequent processing by said processing means before entry into said microcomputer.

8. The device of claim 7 wherein the user telephone is of the rotary dial type, said processing means including a shift register to prepare the amplified proportional electrical signals for entry into said microcomputer.

9. The device of claim 7 wherein the user telephone is of the touch tone type, said processing means including a tone decoder to prepare the amplified proportional electrical signals for entry into said microcomputer.

10. The device of claim 1 wherein said microcomputer is further programmed to compute composite cost information corresponding to the sum of successive ones of individual call costs of calls monitored during a given time period and to display same on said display means in response to an appropriate control signal from said data means.

* * * * *